J. D. AARON.
HAMELESS HORSE COLLAR.
APPLICATION FILED AUG. 13, 1914.
1,143,015.
Patented June 15, 1915.
2 SHEETS—SHEET 1.
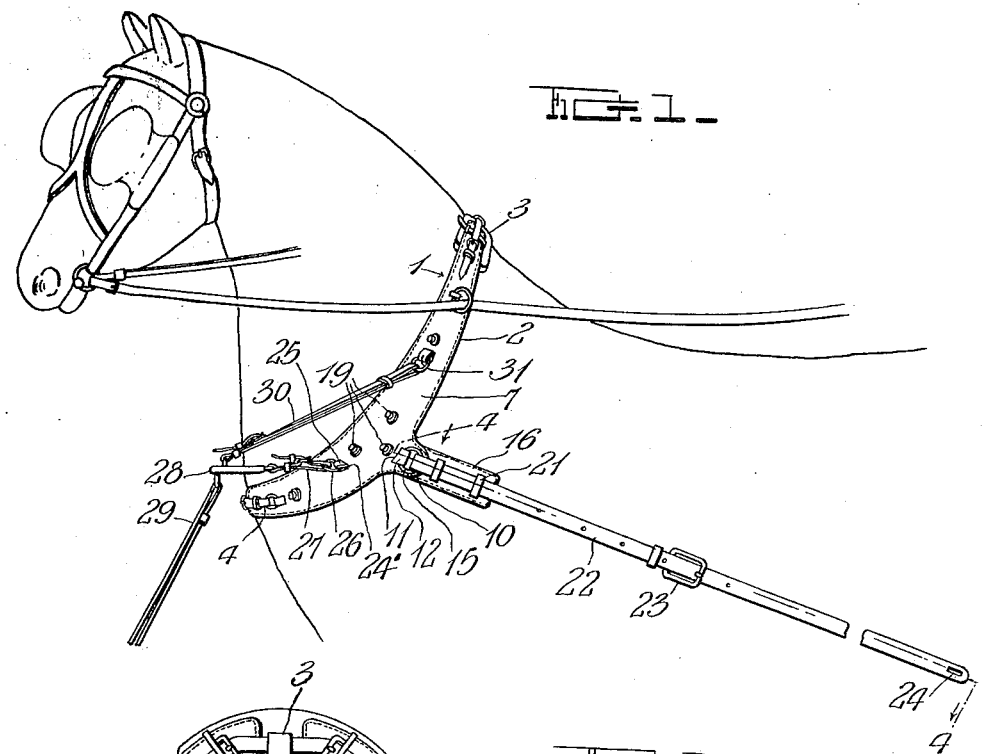
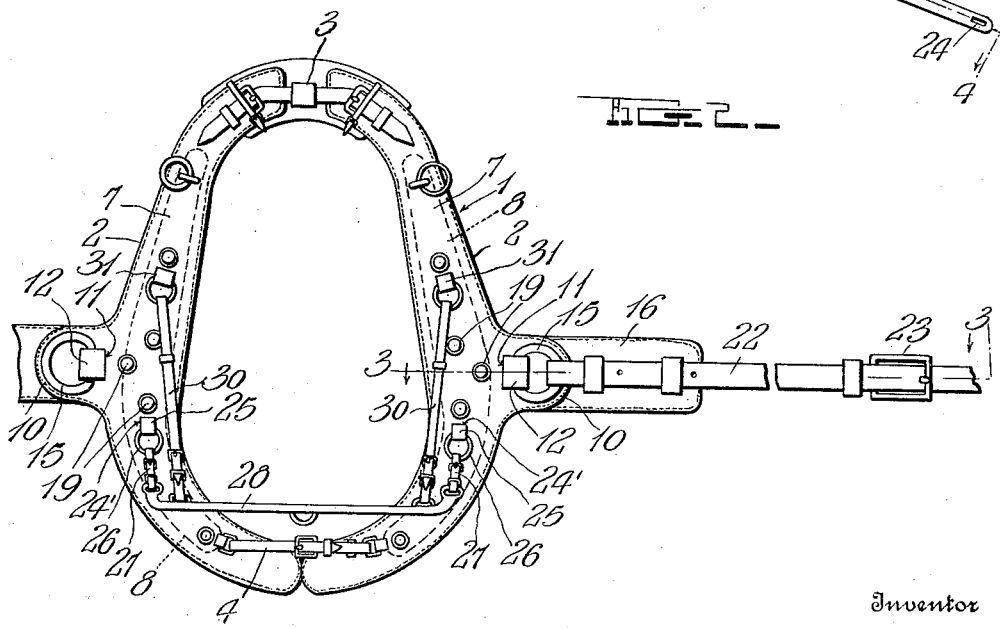
Witnesses
H. Woodard
Inventor
Julius D. Aaron
By H. B. Wilson & Co.
Attorneys

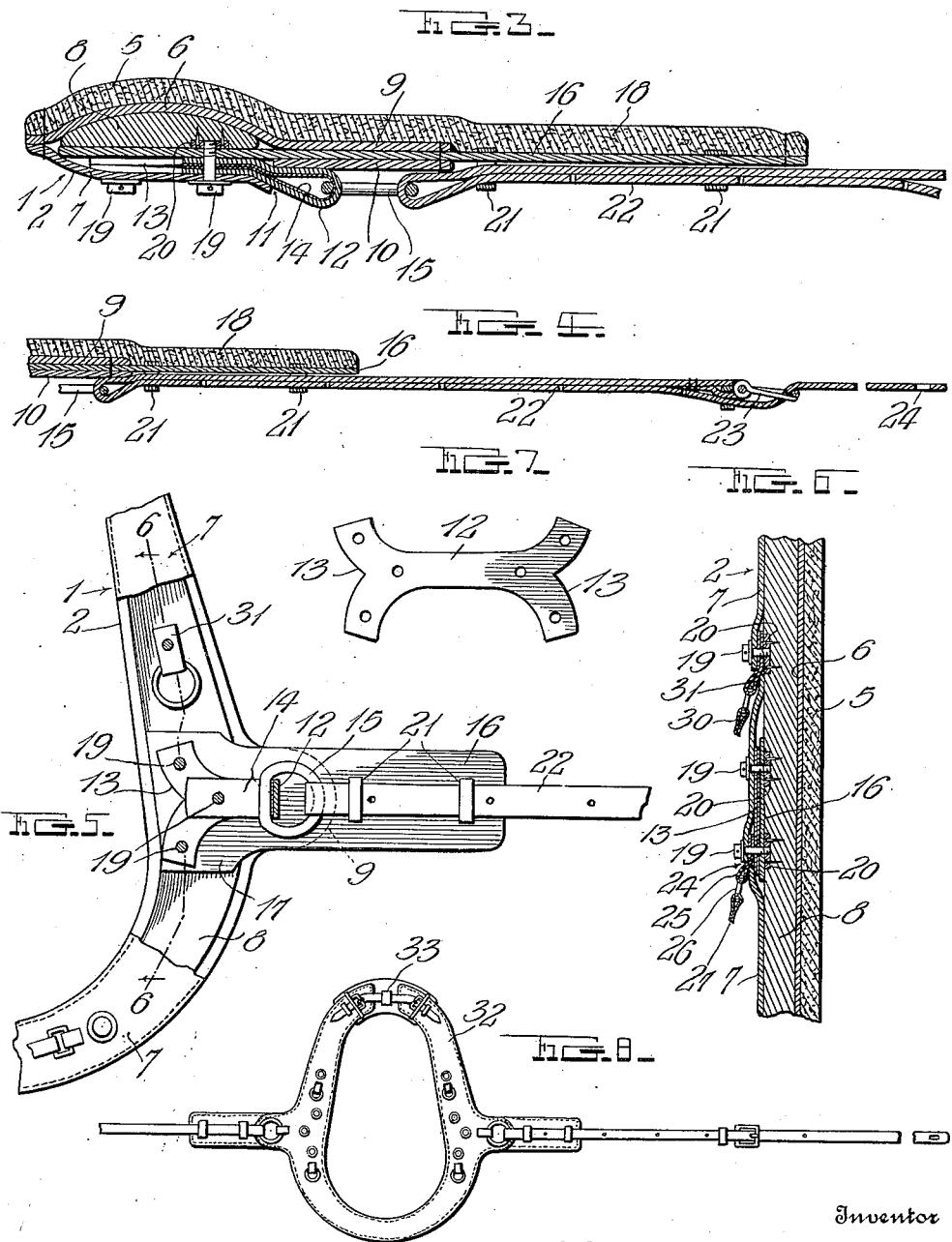

UNITED STATES PATENT OFFICE.

JULIUS D. AARON, OF MOUNT OLIVE, NORTH CAROLINA.

HAMELESS HORSE-COLLAR.

1,143,015.   Specification of Letters Patent.   Patented June 15, 1915.

Application filed August 13, 1914. Serial No. 856,609.

*To all whom it may concern:*

Be it known that I, JULIUS D. AARON, a citizen of the United States, residing at Mount Olive, in the county of Wayne and State of North Carolina, have invented certain new and useful Improvements in Hameless Horse-Collars; and I do declare the following to be a full, clear, and exact description of the invention, such as will enable others skilled in the art to which it appertains to make and use the same.

This invention relates to new and useful improvements in horse collars and more particularly to hameless collars, and the primary object of the invention is to produce a horse collar with sufficient rigidity at each side, to distribute the strain of draft properly throughout both sides thereof and at the same time maintaining the collar in proper form and position on the horse's neck.

A further object of the invention resides in providing a horse collar of this character which will adjust itself to the position of the neck and avoid rubbing and chafing of the same.

A still further object resides in providing an improved construction for securing a tug loop on the collar to which an adjustable trace may be secured.

Still another object of the invention resides in providing a device which is simple and durable in construction, inexpensive to manufacture, and one which will be very efficient and useful in operation.

With these and other objects in view, my invention consists in the novel features of construction, combination and arrangement of parts as will be hereinafter referred to and more particularly pointed out in the specification and claims.

In the accompanying drawings forming a part of this application, Figure 1 is a perspective view showing a collar constructed in accordance with my invention applied to use; Fig. 2 is a front elevation thereof; Fig. 3 is an enlarged detail section as seen on line 3—3 of Fig. 2; Fig. 4 is a section as seen on line 4—4 of Fig. 1; Fig. 5 is an enlarged detail elevation of one limb of the collar with the parts broken away to illustrate more clearly the manner of securing the tug in place; Fig. 6 is a detail section as seen substantially on the line 6—6 of Fig. 5; Fig. 7 is a plan view of the tug prior to its application to use; and Fig. 8 is an elevation of a slightly modified form of the invention.

In describing the invention, I shall refer to the drawings in which similar reference characters designate corresponding parts throughout the several views and in which—

1 designates the collar consisting preferably of a pair of limb members or sections 2, suitably secured together at their upper and lower ends as indicated at 3 and 4 respectively to admit of adjustability for application to necks of various sizes. This connecting means is through the medium of buckles and straps, as clearly shown in Figs. 1 and 2 of the drawings and forms no essential part of this invention. Each limb member or section of the collar comprises a pad or cushion 5 which may be formed of felt or other desired material to rest easily against the body of the animal, a lining or strip of leather 6 applied to the outer face thereof and an outer covering of leather 7. Each limb member or section has disposed between the strips 6 and 7 and extending for a portion of the length of said section, a stiffening member 8 which may be formed of metal, wood or other material and is designed to conform to the outline of the section in which the same is disposed. This stiffening member is designed convex on its one face and flat on its other face, as clearly disclosed in Fig. 3 of the drawings and the pad 5 and leather sections 6 and 7 are so secured together around this stiffening member 8 as to conform to the outline of the latter and secure said stiffening member in place in each section of the collar. This stiffening member, of course terminates some distance from the ends of the sections so as to permit said sections to more readily conform to the neck of the animal to which the collar is applied but said stiffening members will supply such rigidity to the sections as to distribute the strain of draft throughout the length of the device.

An important feature of the invention resides in an improved construction for securing the tug loop to each section to which an adjustable trace may be secured. In carrying out this idea, the leather sections 6 and 7 on each section of the collar are provided about centrally of the sections with laterally extending and alining ears 9 and 10 respectively. The ear 10 at its junction with the leather covering strip 7 is provided with a slit as indicated at 11 and disposed therethrough are the arm portions of a trace engaging loop or tug 12. This loop consists of a strip of leather doubled upon itself and having the arms thereof disposed through the slit 11 to rest against the inner face of the strip 7. The ends of the arms of this strip forming the loop 12 are designed in Y-shape as indicated at 13 to enable said loop to be more firmly secured in place, as will be hereinafter more particularly set forth. A metal lining strip 14 is also provided for this loop 12 to obviously provide a wearing surface therefor and engaged with this loop is a ring 15.

Disposed between the ears 9 and 10 and continuing inwardly to rest flatly against the outer face of the stiffening member 8, is a leather strip or flap 16 which projects laterally some distance beyond the ends of the ears 9. The inner end of this flap or strip 16 is enlarged as indicated at 17 and clearly shown in Fig. 5 of the drawings and the pad 5 is also provided with a lateral extension 18 conforming to the outline of the strip or flap 16. The ears 9 and 10 and the flap or strip 16 are stitched or otherwise secured together as found desirable and the pad 18 is of course, also secured thereto in any desirable manner.

In order to secure the arms of the loop 12 and the inner end of the flap or strip 16 in place, a trio of bolts 19 are provided, the same extending through the Y-shaped ends of the arms of such loop, as indicated by the openings therein. The inner ends of these bolts which are threaded, engage nuts 20 which are removably secured and countersunk in the outer face of the stiffening member 8 as clearly shown in Figs. 3 and 6 of the drawings. These bolts positively secure the loops and strip 16 is place on the sections of the collar and permit the greatest amount of strain to be applied thereto.

Secured to the leather strip or flap 16 are the leather guide loops or keepers 21 through which is guided the looped strap 22 forming the trace, the loop thereof being engaged with the ring 15. This trace is adjustable at a point adjacent the collar as indicated through the buckle connection 23 necessitating but a single opening 24 at the rear end of the trace for engaging the whiffle-tree. The padded strip or flap 16 guides the trace 22 and at the same time prevents the latter from rubbing and chafing the body of the animal, it being obvious that this trace will be spaced a slight distance from the body in view of this padded strip.

The outer strip or covering of leather 7 of each section of the collar is also slit horizontally at a point just below the plane of the laterally extending flap 16, such slit being indicated at 24'. This slit is disposed immediately below the lowermost bolt 19 above referred to and disposed through this slit are the arm portions of a leather loop 25, said arm portions being secured in place by the adjacent bolt 19 as clearly shown in Fig. 6 of the drawings. Engaged with each of the loops 25 is a ring member 26 and removably engaged with the ring members by means of strap connections 27 are the ends of a U-shaped breast iron or the like 28. This breast iron is designed for use only when the collar is applied to a horse of a double team and the iron 28 is connected with a neck yoke, (not shown) by means of a strap connection 29. This iron 28 is held in its proper position by means of adjustable strap connections 30 which are engaged with the iron adjacent its ends. These strap connections also engage rings carried by additional loops 31 which are also bolted in place on the sections of the collar above the horizontal plane of the lateral flaps 16, such bolting of the loops being similar to the securing of the other loops described. Through this medium the iron is held in proper position with respect to the collar as clearly shown in Fig. 1 of the drawings.

In Fig. 8, I have shown a slightly modified form of the invention wherein a collar 32 is provided, the same being formed of a single section, the ends of which are adapted to be secured together at the upper portion of the collar as indicated at 33. In this form of the invention, the breast iron is omitted but otherwise, the construction of the collar is the same as the form heretofore described.

It will be understood that the breast iron as described in connection with the first mentioned form, is particularly useful in the backing of a vehicle to which a double team is attached and in a single team, such an iron is not particularly useful. Hence the omission thereof in the form shown in Fig. 8. The attaching means for such iron, however, is shown and the iron may be applied when desired so that it will not be necessary to construct a different form of collar when it is not desired to use such a device.

From the foregoing description of the construction of my improved hameless collar, the manner of applying the same to use and the advantages thereof will be readily understood, and it will be seen that I have provided a simple, inexpensive and efficient means for carrying out the objects of the invention.

While I have particularly described the elements best adapted to perform the functions, set forth, it is obvious that various changes in the form, proportion, and in the minor details of construction may be resorted to, within the scope of the appended claims, without departing from the spirit or sacrificing any of the principles of the invention.

Having thus described my invention, what I claim is:

1. In a horse collar, a body including a pad, a stiffening member and a covering therefor securing the same to said pad, a lateral flap removably secured to said stiffening member, and an engaging loop disposed through said covering and also engaged with said stiffening member.

2. In a horse collar, a body including a pad, a stiffening member and a covering therefor securing the same to said pad, a lateral flap, and means for removably securing said flaps to said stiffening member, and an engaging loop disposed through said covering and removably secured to said stiffening member by the same means which secures said flap thereto, said loop projecting on the outer face of said flap and adapted to be engaged by a trace.

3. In a horse collar, a body including a pad, a stiffening member applied thereto, a covering for said stiffening member securing the same to said pad, said covering having a slit therein, a lateral flap applied to said stiffening member and projecting beyond the covering therefor, an engaging loop having its ends disposed through the slit in said covering, and means extending transversely through the cover flap and loop and engaging said stiffening member for removably securing said flap and loop to the body.

4. In a horse collar, a body including a pad, a stiffening member therefor and covering for the same securing the stiffening member to said pad, said covering having a slit therein, a flap applied to the stiffening member and projecting laterally beyond the covering thereon, a loop having its ends designed Y-shape and disposed through the slit in said covering, and means extending transversely through the cover flap and loop and engaging said stiffening member to removably secure said loop and flap in place on the body.

5. In a horse collar, a body including a pad, a stiffening member, flexible strips inclosing said stiffening member and secured to said pad, the outer flexible strip being provided with a slit at a predetermined point therein, laterally extending alining ears formed on said flexible strips, a flap disposed between the ears and projecting laterally therebeyond, a loop having its ends disposed through the slit in the one flexible strip, and means for removably securing said loop and flap to the body.

6. In a horse collar, a body including a pad, a stiffening member therefor, flexible strips inclosing said stiffening member and secured to said pad, the outer strip being provided with a slit at a predetermined point therein, laterally extending ears formed on one side edge of said strips, a flap applied to the outer face of said stiffening member and projecting laterally between said ears to project beyond the latter, a loop having its arms disposed through the slit in said outer flexible strip, and means extending through the parts for removably securing said flap and loop to the stiffening member.

7. In a horse collar, a body, a lateral flap secured thereto and carrying guide loops thereon, an engaging loop also secured to the body by the same means securing the flap thereto and resting against the outer face of said flap, a ring member engaged with the last mentioned loop, and an adjustable trace engaging said ring member.

In testimony whereof I have hereunto set my hand in presence of two subscribing witnesses.

JULIUS D. AARON.

Witnesses:
J. A. GRIESBAUER,
C. GIOVANNETTI.

Copies of this patent may be obtained for five cents each, by addressing the "Commissioner of Patents, Washington, D. C."